UNITED STATES PATENT OFFICE.

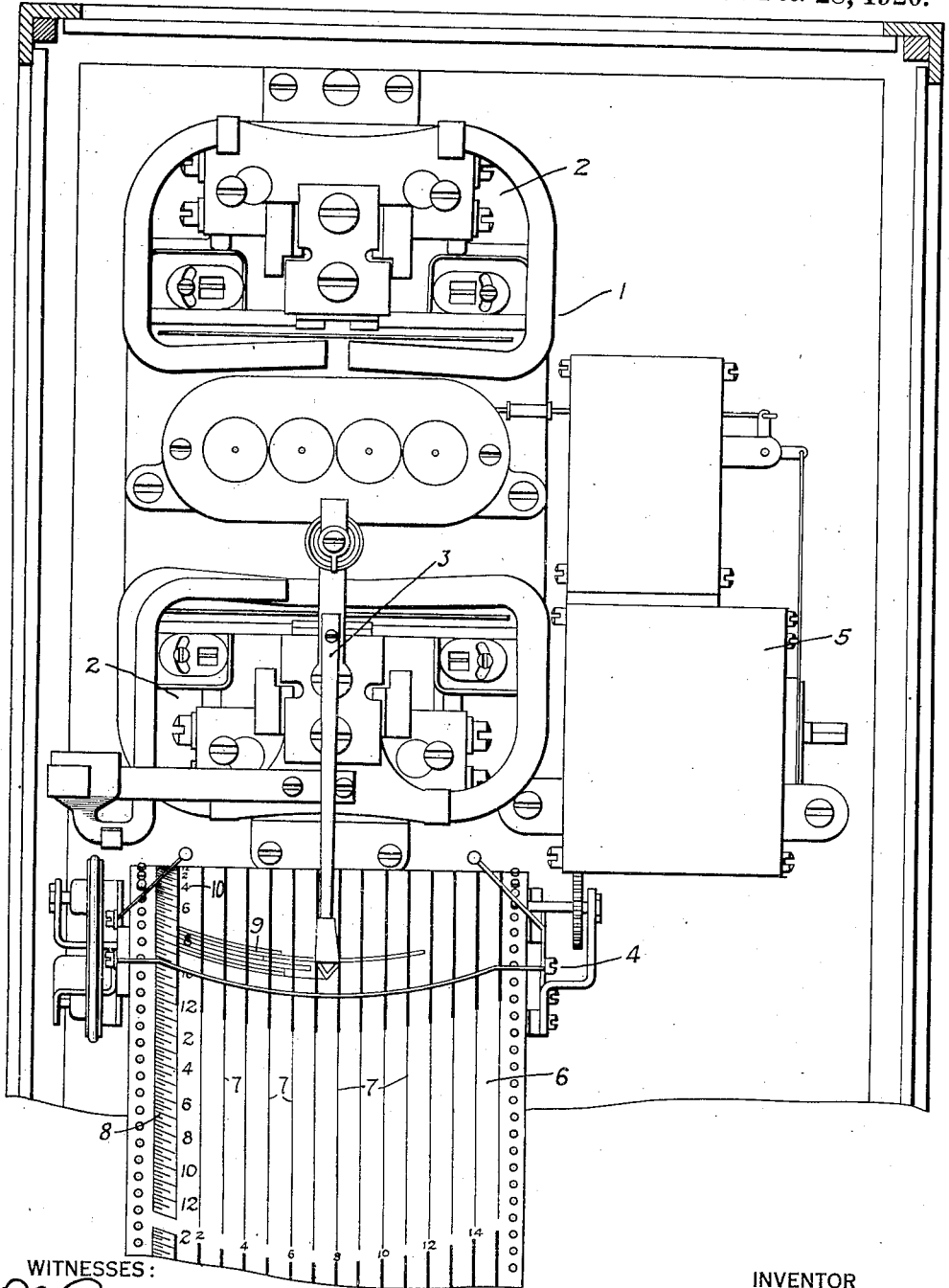

WILLIAM M. BRADSHAW, OF WILKINSBURG, PENNSYLVANIA, ASSIGNOR TO WESTINGHOUSE ELECTRIC AND MANUFACTURING COMPANY, A CORPORATION OF PENNSYLVANIA.

RECORD-SHEET FOR MEASURING INSTRUMENTS.

1,363,712.                Specification of Letters Patent.        Patented Dec. 28, 1920.

Application filed January 5, 1916. Serial No. 70,468.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Record-Sheets for Measuring Instruments, of which the following is a specification.

My invention relates to record sheets for measuring instruments, and it has for its object to provide a record sheet that may be easily and accurately read.

Heretofore, it has been customary to record measurements upon a sheet that was provided with laterally and longitudinal-extending reference marks or lines for the purpose of reading the values of the measurements. However, it was found that, when the record coincided with one of the reference marks, it was difficult to distinguish which line represented the measurement. In order to preclude the possibility of mistaking one line from another, I provide a record sheet having a plurality of longitudinally-extending parallel lines thereon and a plurality of laterally-extending parallel lines along one of its edges. If the marking device of the instrument makes its record in the form of curved lines, the laterally extending lines will preferably have a corresponding curvature. Thus, if the respective reference lines are indicated by reference numerals, a clear and easily readable record may be obtained.

The single figure of the accompanying drawing illustrates an electrical measuring instrument equipped with a record sheet embodying my invention.

An electrical measuring instrument 1 comprises electro-responsive means 2, a marking device 3, a record-sheet advancing device 4, and a clock mechanism 5 for controlling the advancing of a record sheet 6. While I have shown a particular type of measuring instrument any other suitable form of measuring instrument may be used, if desired.

The record sheet 6 has printed or otherwise marked on its face a plurality of longitudinally-extending parallel lines 7 and a plurality of laterally-extending parallel lines 8 along one of its edges. The lines 8 are relatively short and may be of varying lengths to facilitate reading the record. That is, if the instrument is adapted to record maximum demands of energy for half or quarter hour periods, the longer lines may be used for the former and the shorter lines for the latter case. The lines 8 may also be of the same general curvature as the record 9 made by the marking device 3. The longitudinally-extending lines 7 may be broken at regular intervals to receive indexes or other indicating marks to facilitate reading the values of the record, and different sections of these lines may be of varying weights to distinguish between day and night records. The various marks 8 may also be provided with scale markings 10 to facilitate the reading of the record.

My device has the advantage that the markings do not extend sufficiently far into the body of the record sheet to render the record difficult to read.

While I have illustrated my invention in connection with an electrical measuring instrument, it will be understood that it is not so limited, but is adaptable for use with any type of measuring instrument, and I desire that it shall not be limited except as set forth in the appended claims.

I claim as my invention:

1. A record sheet for recording measuring instruments having longitudinal division marks thereon and lateral division marks along one of its edges only to coöperate with the record to facilitate reading the same.

2. A record sheet for recording measuring instruments having longitudinally-extending division marks of various widths thereon and laterally-extending division marks along the edge only to coöperate with the record to facilitate reading the same.

3. A record sheet having relatively short laterally-extending curved division marks along its edge only to coöperate with the record to facilitate reading the same.

4. A record sheet for a recording meter having longitudinally-extending lines of different widths at predetermined portions thereof to coöperate with the record to facilitate reading the same.

5. A record sheet for recording instruments having relatively short laterally-extending curved lines along one of its edges only and longitudinally-extending lines severally of various widths at different portions thereof to coöperate with the record on the sheet to indicate the time the record was made.

6. A record sheet for recording meters having relatively short laterally-extending lines along its edge only and longitudinally-extending lines of different widths at predetermined portions thereof to coöperate with the record to facilitate reading the same.

7. A record sheet for recording meters having relatively short laterally-extending curved lines along its edge only and longitudinally-extending lines of one width between predetermined lines on the edge and another width between other predetermined lines to coöperate with the record to facilitate reading the same.

In testimony whereof I have hereunto subscribed my name this 23rd day of Dec., 1915.

WILLIAM M. BRADSHAW.